(12) United States Patent
Schneider et al.

(10) Patent No.: US 10,024,415 B2
(45) Date of Patent: Jul. 17, 2018

(54) ISOLATING DECOUPLER

(71) Applicant: GATES CORPORATION, Denver, CO (US)

(72) Inventors: Dean Schneider, Washington, MI (US); Alexander Serkh, Troy, MI (US); Benjamin R. Langhorst, Beverly Hills, MI (US)

(73) Assignee: GATES CORPORATION, Denver, CO (US)

( * ) Notice: Subject to any disclaimer, the term of this patent is extended or adjusted under 35 U.S.C. 154(b) by 111 days.

(21) Appl. No.: 14/930,278

(22) Filed: Nov. 2, 2015

(65) Prior Publication Data
US 2017/0122425 A1 May 4, 2017

(51) Int. Cl.
F16H 55/36 (2006.01)
F16D 13/08 (2006.01)
F16D 13/76 (2006.01)

(52) U.S. Cl.
CPC ............ *F16H 55/36* (2013.01); *F16D 13/08* (2013.01); *F16D 13/76* (2013.01); *F16D 2300/22* (2013.01); *F16H 2055/366* (2013.01)

(58) Field of Classification Search
CPC .......................... F16H 55/36; F16H 2055/366
USPC ........................................................ 474/94
See application file for complete search history.

(56) References Cited

U.S. PATENT DOCUMENTS

| 5,156,573 | A | 10/1992 | Bytzek et al. | |
| 7,591,357 | B2 * | 9/2009 | Antchak | F16D 41/206 192/41 S |
| 8,813,928 | B2 * | 8/2014 | Schneider | F16D 7/022 192/41 S |
| 9,046,133 | B2 * | 6/2015 | Marion | B60K 25/02 |
| 9,291,253 | B1 * | 3/2016 | Serkh | F16D 41/206 |
| 9,441,677 | B2 * | 9/2016 | Williams | F02B 67/06 |
| 9,605,743 | B2 * | 3/2017 | Canto Michelotti | F16H 55/36 |
| 2011/0065537 | A1 * | 3/2011 | Serkh | F16D 7/022 474/94 |
| 2011/0245000 | A1 * | 10/2011 | Serkh | F16F 15/1216 474/94 |
| 2011/0256968 | A1 * | 10/2011 | Serkh | F16D 3/12 474/70 |
| 2012/0015768 | A1 * | 1/2012 | Serkh | F16H 55/36 474/94 |

(Continued)

FOREIGN PATENT DOCUMENTS

| DE | 102009052611 A1 | 5/2011 |
| WO | 2012061936 A1 | 5/2012 |

*Primary Examiner* — William E Dondero
*Assistant Examiner* — Mark K Buse
(74) *Attorney, Agent, or Firm* — Jeffrey A. Thurnau, Esq.; Paul N. Dunlap, Esq.

(57) ABSTRACT

An isolating decoupler comprising a hub for connection to a shaft, a pulley journalled to the hub, the pulley having a belt engaging surface, a composite spring having a clutch portion, a transition portion and a variable diameter portion, the composite spring engaged between the hub and the pulley, the clutch portion diameter reducible in a loading direction for a frictional engagement with the pulley in the loading direction, the frictional engagement of the clutch portion progressively releasable from the pulley in an unloading direction, the variable diameter portion having a diameter which varies according to a torque load; and an inertial member engaged with the hub through a damping member.

8 Claims, 6 Drawing Sheets

(56) References Cited

U.S. PATENT DOCUMENTS

| | | | |
|---|---|---|---|
| 2012/0015788 A1 | 1/2012 | Serkh | |
| 2012/0298474 A1* | 11/2012 | Ward | F16D 7/022 |
| | | | 192/41 S |
| 2013/0092501 A1* | 4/2013 | Schneider | F16D 7/022 |
| | | | 192/41 S |
| 2013/0098727 A1 | 4/2013 | Williams et al. | |
| 2013/0324335 A1* | 12/2013 | Chen | F16D 41/206 |
| | | | 474/94 |
| 2014/0008175 A1 | 1/2014 | Schneider et al. | |
| 2015/0252884 A1* | 9/2015 | Serkh | F16H 55/36 |
| | | | 474/94 |
| 2015/0285366 A1* | 10/2015 | Serkh | F16H 55/36 |
| | | | 474/94 |
| 2016/0069418 A1* | 3/2016 | Schneider | F16F 15/1442 |
| | | | 188/380 |
| 2016/0138700 A1* | 5/2016 | Hauck | F16F 15/12306 |
| | | | 474/94 |

* cited by examiner

ISOLATING DECOUPLER

FIELD OF THE INVENTION

The invention relates to an isolating decoupler, and more particularly, to an isolating decoupler having a composite spring having a clutch portion, a transition portion and a variable diameter portion.

BACKGROUND OF THE INVENTION

Diesel engine use for passenger car applications is increasing due to the benefit of better fuel economy. Further, gasoline engines are increasing compression ratios to improve the fuel efficiency. As a result, diesel and gasoline engine accessory drive systems have to overcome the vibrations of greater magnitude from crankshafts due to above mentioned changes in engines.

Due to increased crankshaft vibration plus high acceleration/deceleration rates and high alternator inertia the engine accessory drive system is often experiencing belt chirp noise due to belt slip. This will also reduce the belt operating life.

Crankshaft isolators/decouplers and alternator decouplers/isolators have been widely used for engines with high angular vibration to filter out vibration in engine operation speed range and to also control belt chirp.

Representative of the art is U.S. Pat. No. 7,591,357 which discloses a decoupler provided for transferring rotary movement between an engine driven crankshaft and a serpentine belt. The decoupler has a rotary driving member and a rotary driven member coaxially mounted with the driving member for relative rotary movement therewith. A decoupling assembly extends between the driving member and the driven member. The decoupling assembly selectively couples the driving and driven members when the driving member rotates relative to the driven member in a first coupling sense. The decoupling assembly uncouples the driving member from the driven member when the driving member rotates relative to the driven member in a second sense opposite the first sense. A torsional vibration damper is mounted for rotation with one of the driving and driven members to cancel some of the vibrations generated by the engine.

Also representative of the art is U.S. patent application Ser. No. 13/952,886 filed Jul. 29, 2013 which discloses an isolating decoupler comprising a wrap spring disposed radially inward of a torsion spring engaged with a spring carrier and frictionally engagable with a pulley in a loading direction that is opposite that of the torsion spring, the wrap spring engagable with the hub whereby the frictional engagement with the pulley can be released.

What is needed is an isolating decoupler having a composite spring having a clutch portion, a transition portion and a variable diameter portion. The present invention meets this need.

SUMMARY OF THE INVENTION

The primary aspect of the invention is an isolating decoupler having a composite spring having a clutch portion, a transition portion and a variable diameter portion.

Other aspects of the invention will be pointed out or made obvious by the following description of the invention and the accompanying drawings.

The invention comprises an isolating decoupler comprising a hub for connection to a shaft, a pulley journalled to the hub, the pulley having a belt engaging surface, a composite spring having a clutch portion, a transition portion and a variable diameter portion, the composite spring engaged between the hub and the pulley, the clutch portion diameter reducible in a loading direction for a frictional engagement with the pulley in the loading direction, the frictional engagement of the clutch portion progressively releasable from the pulley in an unloading direction, the variable diameter portion having a diameter which varies according to a torque load; and an inertial member engaged with the hub through a damping member.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
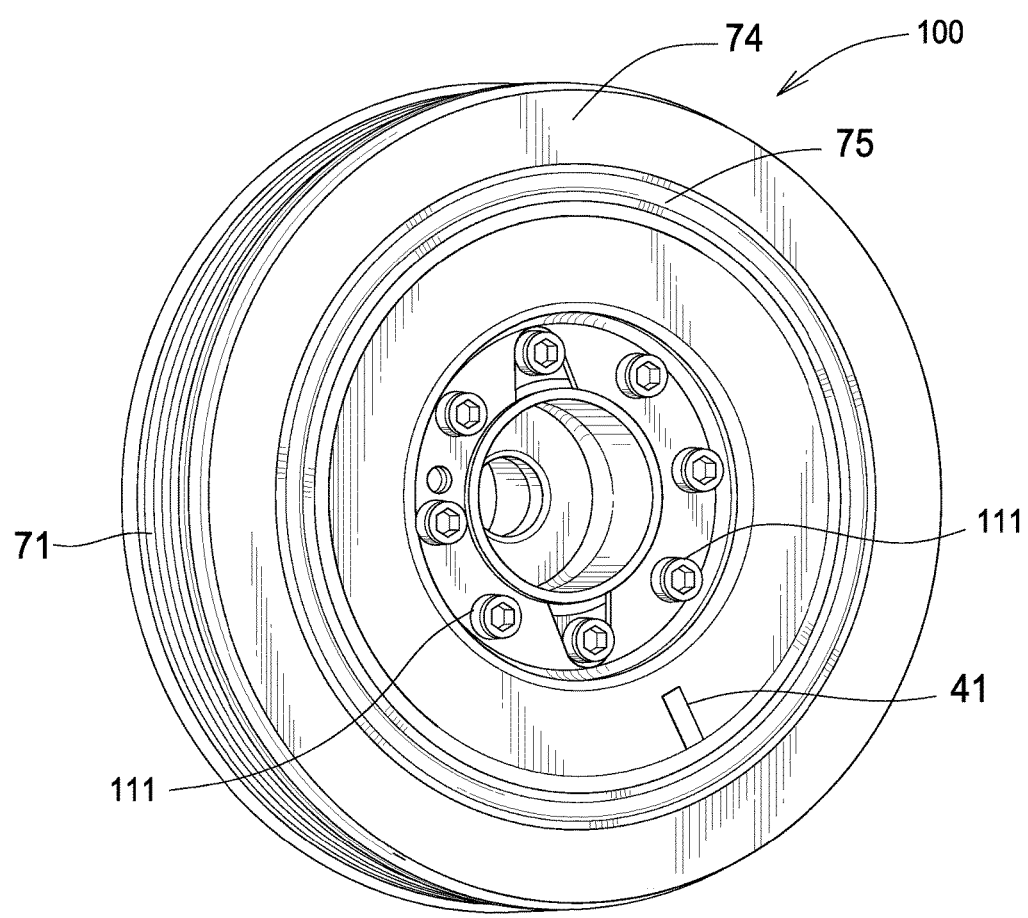
FIG. 1 is a front perspective view.

FIG. 1 is a front perspective view. The present invention 100 provides isolation and damped decoupling features as well as infinite overrun capability without bumper stops. This is accomplished by utilizing one multi-purpose composite spring instead of a combination of a wrap spring and a torsion spring coupled by a spring carrier.

Figure 2:
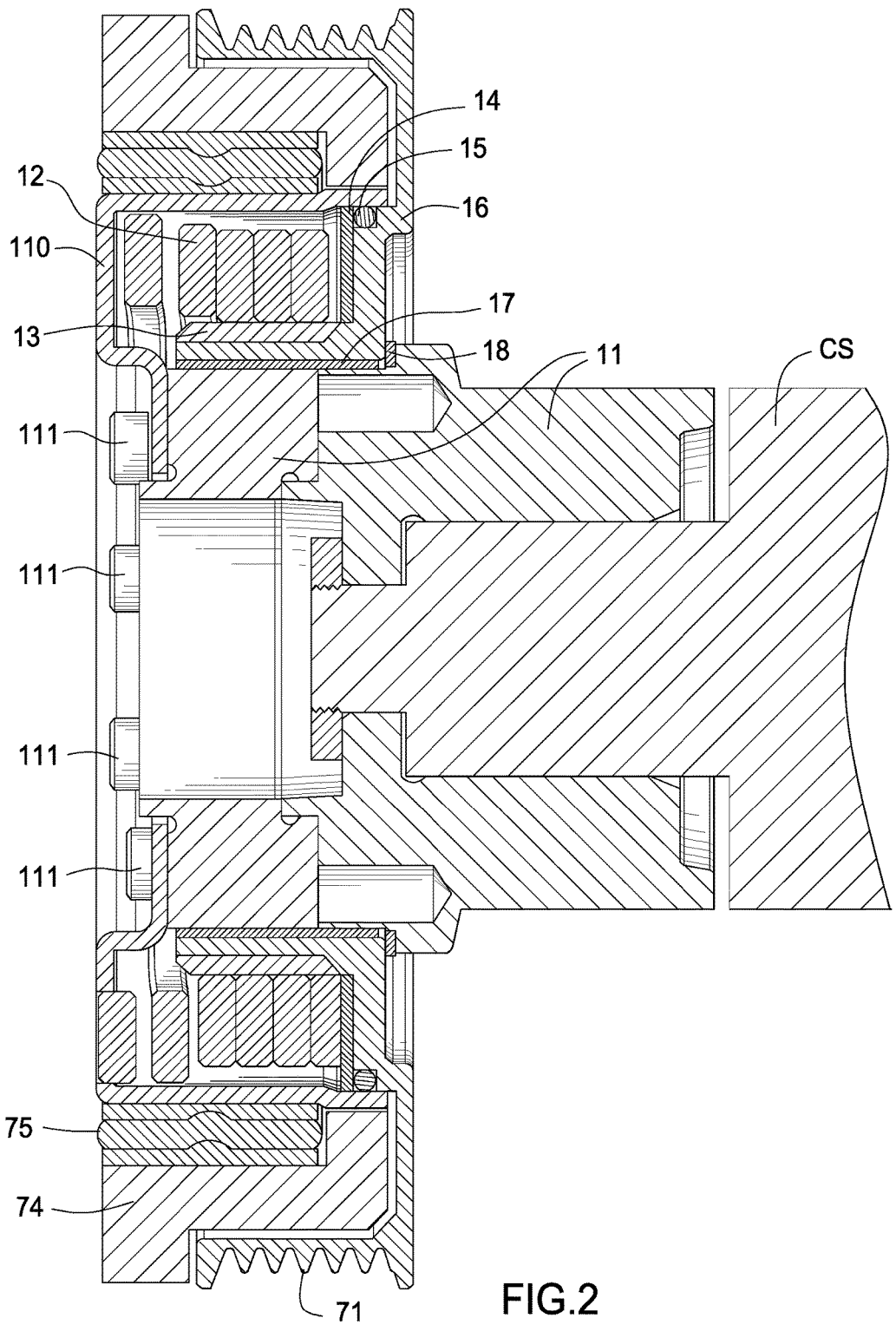
FIG. 2 is a cross-sectional view.

FIG. 2 is a cross-sectional view. The isolating decoupler 100 comprises crankshaft hub end cap 110, a single composite spring 12, pulley member 13, O-ring retention washer 14, O-ring 15, pulley 16, bushing/bearing 17, 18, and a hub 11. End cap 110 is fixed to hub 11 by threaded fasteners 111.

The present invention further comprises rubber crankshaft vibration damper 75 and inertia mass damper 74. Damper 75 and mass 74 are press fit on end cap 110. The mass damper 74 works in tandem with the isolation portion of the torsion spring 12 to decrease the amplitude of crankshaft angular vibration transmitted to pulley 16 from the crankshaft CS. The isolation effects of the present invention reduce the amplitude of angular vibration for a crankshaft so that pulley 16 experiences less angular vibration than the crankshaft hub 11 due to, for example, cylinder firing events. This in turn reduces the angular vibration on the belt driven accessories such as power steering, air conditioning and alternator, thereby extending working life of the components (not shown).

Figure 5:
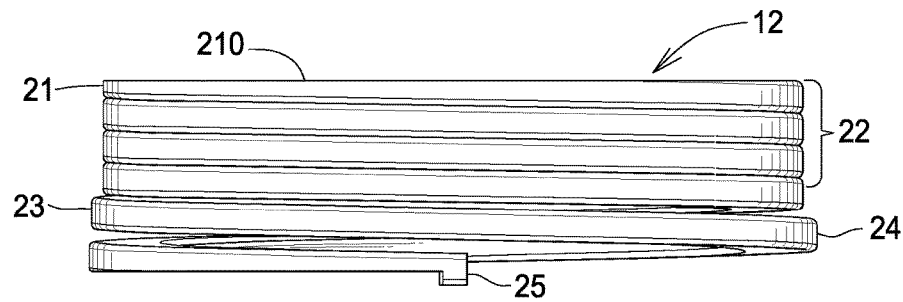
FIG. 5 is a side view of the composite spring.
Figure 6:
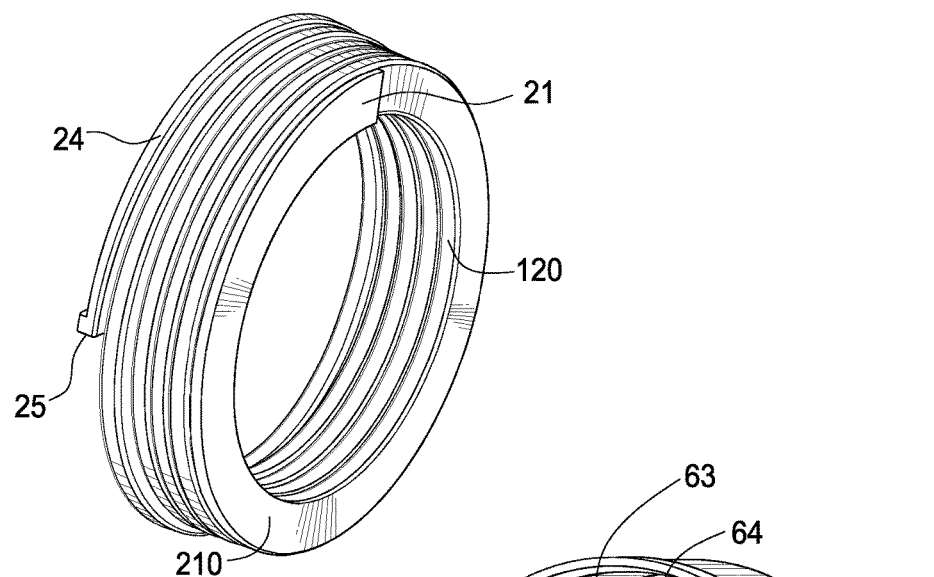
FIG. 6 is a perspective view of the composite spring.

FIG. 5 is a side view of the composite spring. Composite spring 12 comprises one end 21 that may be ground flat 210 to allow for more compact packaging. Composite spring 12 also comprises a clutch portion 22 that provides wrap-spring clutch functionality about pulley member 13. Transition portion 23 of the composite spring allows means by which the coil diameter may change. Transition portion has a helical shape in the unloaded condition with increasing diameter from the clutch portion 22 to tab 25. Transition portion 23 may comprise a single coil or multiple coils or a fraction of a coil. Variable diameter portion 24 of the composite spring provides isolation functionality by which it can change its diameter through angular displacement of the two ends of the spring (21, 25) in response to torque changes. The diameter may increase or decrease depending upon the torque load. Tab 25 at one end of composite spring 12 is used to engage slot 41 in end cap 110. Portion 24 has a helical shape in the unloaded condition.

Figure 3:
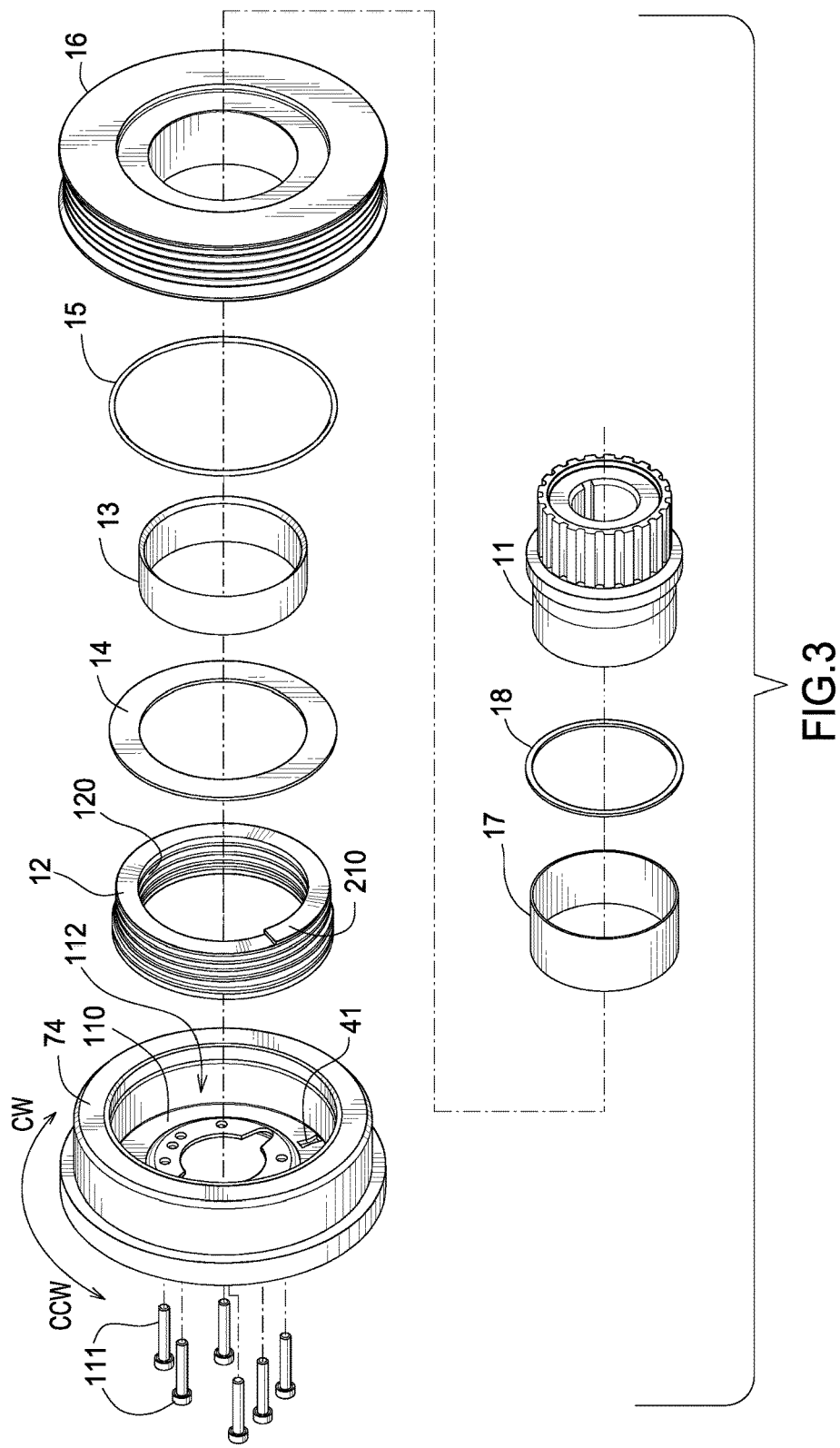
FIG. 3 is an exploded view.
Figure 4:
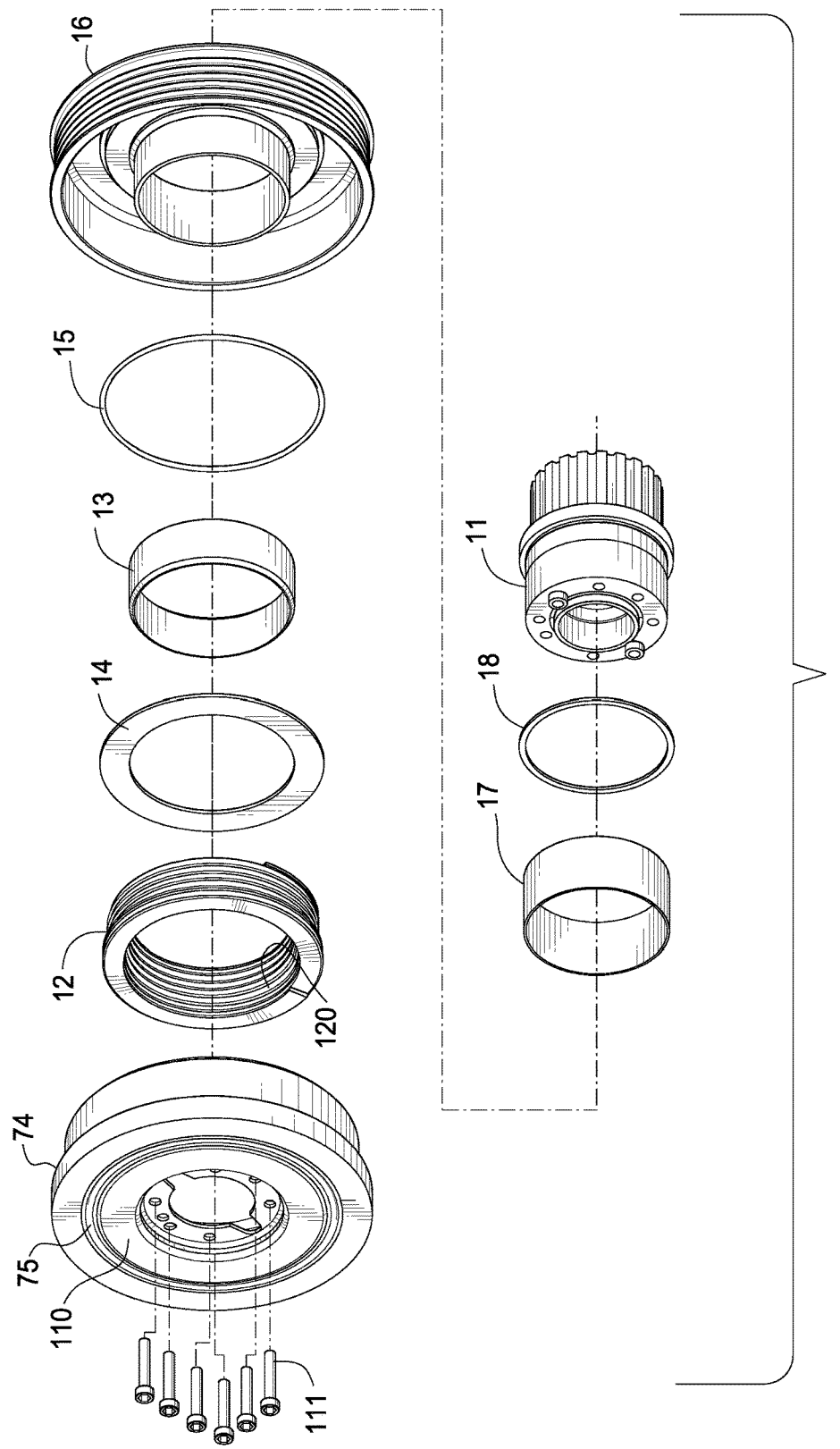
FIG. 4 is an exploded view.

FIG. 3 and FIG. 4 are each an exploded view. Composite spring 12 resides in pocket 112 within end cap 110. Composite spring 12 is engaged with slot 41 by tab 25. Tab 25 engages slot 41 in the end cap so that clockwise rotation of the hub 11 grips tab 25 which causes composite spring 12 to wrap tighter upon itself, thereby decreasing the diameter of clutch portion 22. Tab 25 could be replaced with other forms of engagement as long as those forms permit the transmission of torque from composite spring 12 to end cap 110 in both directions (i.e. clockwise CW and counter-clockwise CCW).

On the other end, composite spring 12 has a flat end 210 which engages O-ring retention washer 14. Clutch portion 22 of composite spring 12 is connected to pulley 16 via a frictional engagement of the composite spring's inner surface 120 with the annular pulley member 13 on pulley 16. Member 13 comprises a hard, tough, and wear-resistant material to withstand repeated slip events without significant erosion or changes in surface friction characteristics. Member 13 may comprise tool steel, but other materials such as common steel alloys, compounded bearing sleeves, bushing materials, engineered wear-resistant polymers are also suitable. Pulley 16 may be made of this same material, or alternatively, it may be more economical to make member 13 of the wear-resistant material and assemble it rigidly to pulley 16 such as by press fit. Pulley 16 can then be made of a less durable material such as plastic.

One or more coils of clutch portion 22 of composite spring 12 wrap around member 13 so that when spring 12 is wound tighter upon itself (as would be the case during normal operation of clockwise crankshaft rotation in the loading direction), the composite spring frictionally grips member 13 tighter and transmits all of the crankshaft's torque to member 13 and thereby to pulley 16, and thereby to any belt driven accessories on an engine (not shown).

Figure 8:
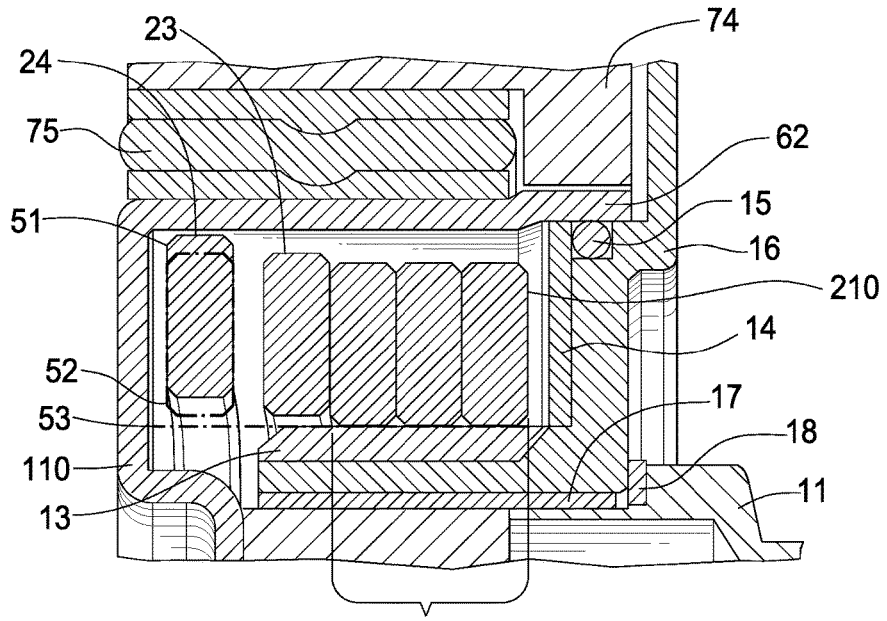
FIG. 8 is a detail of FIG. 2.

Under minimal torque, portion 24 of the composite spring assumes its free state position 51, see FIG. 8. As the crankshaft turns and applies increased levels of torque to the composite spring and pulley, variable diameter portion 24 of composite spring 12 twists under the torque. This causes the coil diameter of the variable diameter portion to shrink slightly, see deformation to loaded position 52. Under the maximum torque the inner diameter of the variable diameter portion 24 does not interfere with the outer diameter 53 of the pulley's friction surface namely pulley member 13. Clutch portion is shown frictionally engaged with member 13. This allows torque transmission from hub 11 to end cap 110, to spring 12 and to pulley 16.

In an alternate embodiment, the interface between the clutch portion 22 and pulley member 13 may be lubricated to endure millions of cycles with relatively consistent overrun torque limit characteristics. In embodiments that require lubrication, the entire composite spring pocket 112 may be filled with lubricant to prevent the lubricant material from being centrifugally pulled away from the friction surfaces over time. Embodiments in which the entire composite spring pocket 112 is filled with lubricant comprise an O-ring seal 15 between the pulley 16 and end cap 110 to retain the lubricant. An industrial adhesive seal is deployed on the outer surface of the end cap 110 to cover slot 41 that engages the composite spring's end tab 25. Washer 14 forms part of the O-ring pocket and also provides a low-friction interface between the flat end 210 of the spring and pulley where relative rotation between the composite spring and pulley will occur.

Figure 7:
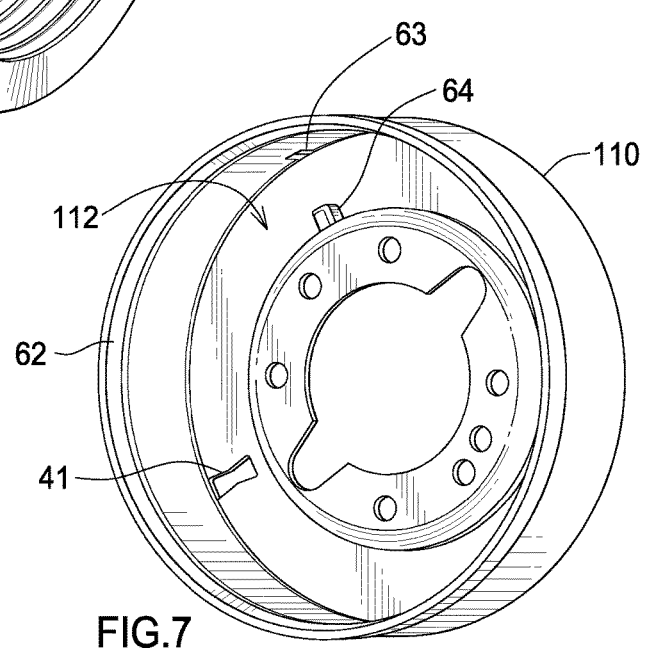
FIG. 7 is a detail of the end cap.

FIG. 7 is a detail of the end cap. Composite spring end 25 is inserted into the slot 41 in end cap 110. Approximately 90 degrees around the coil in the direction of spring coil rotation, one or more tab features 63, 64 further restrict motion of end 21 of composite spring 12. The plurality of contacts between the end cap piece and the composite spring end 21 apply torque to the composite spring around the central axis of the crankshaft and thereby of axis of rotation of hub 11. The plurality of contacts grip the end of the composite spring with sufficient purchase to properly transmit torque without also transmitting a transverse load that would shift the composite spring within the pocket 112.

End cap 110 is relatively simple to manufacture using common stamping methods. The inner rim 62 of end cap 110 forms part of the O-ring seal, see o-ring 15, while other embodiments may eliminate the need for the o-ring seal 15.

In addition to angular vibration isolation, the present invention features decoupling behavior that limits the transmission of rapid deceleration events from the crankshaft to the pulley. In the event of a rapid deceleration of the crankshaft hub (e.g. during a transmission shift), the inertia of the pulley and belt driven system apply clockwise inertial torque to the sleeve 13 and composite spring 12. This torque is transferred in the clockwise direction, which causes composite spring 12 to unwind and the clutch portion 22 to slightly grow in diameter. This loosens the frictional interface between member 13 and composite spring clutch portion 22.

Figure 9:
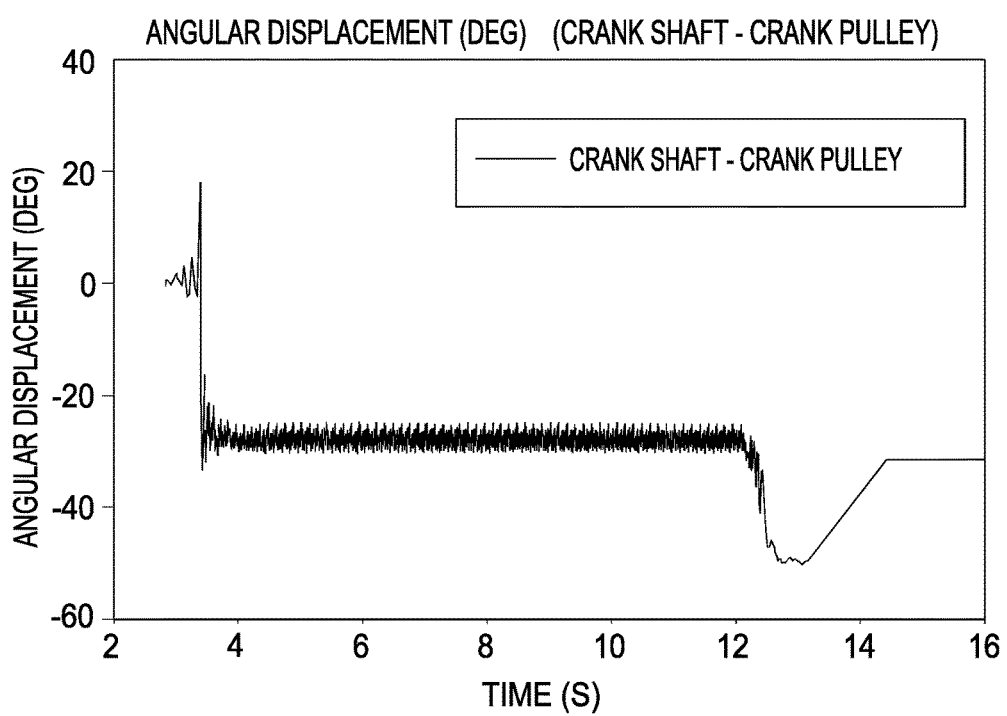
FIG. 9 is a plot of angular displacement between the pulley and crankshaft.

As torque across the pulley grows and the interface continues to loosen, an overrun torque limit level will be reached above which the member 13 will slip inside the composite spring 12. FIG. 9 is a plot of angular displacement between the pulley and crankshaft, and an overrun event is highlighted. In this particular example, the overrun event is the result of high crankshaft deceleration during the process of engine startup. The plot shows an engine start event (around 2.75 seconds on the time axis), idle for approximately 9 seconds, and then engine shutoff at around 12 seconds. If an overrun event had not occurred, the angular displacement during idle would have been approximately +22 degrees. The overrun event at around 3.25 seconds caused the pulley to rotate ahead of the crankshaft by approximately 50 degrees before latching back onto the crankshaft through spring 12. During the time range from 4-12 seconds, the pulley and crankshaft are connected via the composite spring 12, and the torque transmitted through the spring is causing approximately +22 degrees of deflection. The 50 degrees of overrun (negative displacement) combined with the 22 degrees of composite spring deflection (positive displacement) result approximately −28 degrees of deflection. At engine shutoff (around 12 seconds on the time axis), the 22 degrees of composite spring deflection is removed because torque is no longer being transferred from the crankshaft to the pulley through the composite spring. The final displacement value is comprised only of the 50 degrees of overrun that occurred during startup.

As the composite spring is loaded and unloaded, approximately 10 N*m of damping is observed. This measure of damping is calculated as the difference between the dynamic torque at a given composite spring deflection whether the spring is being loaded or unloaded. An overrun torque of approximately 15 N*m is observed along with a hysteresis loop in which a counter-clockwise torque is applied and then removed. After the counter-clockwise torque, a clockwise torque is again applied and displacement occurs at a given overrun torque. At 100 degrees of relative rotation the torque value is approximately −40 N*m while counter-clockwise torque is being applied, and approximately −30 N*m while counter-clockwise torque is being removed. This is the basis for the calculation of 10 N*m of damping. While 10 N*m of damping is advantageous for many passenger automotive applications, other damping values may be desirable for other transportation applications involving different engine sizes or accessory belt designs.

The overrun torque limit at which slip begins are relatively small, on the order of 10-20 N*m, so that small amounts of over-run inertia will cause the decoupling action. As member 13 slips within composite spring clutch portion 22, the overrun torque limit will continue to be transferred by friction from the composite spring to member 13 acting as drag on the pulley 16. Drag torque applied while the pulley turns independently of the crankshaft is called "damped decoupling." The drag torque provides system damping and protects the system from rapid reactions to small levels of torque variation (e.g. less than 10 N*m). The overrun torque limit can be calculated and the composite spring and member engineered for specific engine torque specifications and pulley geometries to adjust the overrun torque limit to provide appropriate damping for various engine systems.

As an example, for a member 13 outer diameter of 78.1 mm and composite spring clutch portion 22 inner diameter of 77.2 mm, there will be 0.9 mm of diametral interference that must be overcome to install the composite spring around member 13. When assembled with a grease lubricant on member 13, the assembly will have the following torque characteristics: when hub 11 is held stationary and pulley 16 is rotated clockwise, it requires approximately 15 N*m of overrun torque to decouple and rotate relative to hub 11. Once decoupled, pulley 16 will rotate clockwise without limit to its angular deflection and the 15 N*m of overrun torque will be constantly required to drive relative rotation. This measure of torque is referred to as "overrun torque limit". When applied torque levels are below the overrun torque limit, the torque in the clutch portion 22 is not large enough to cause the composite spring 12 to unwind and grow in diameter. Consequently, clutch portion 22 remains locked in its frictional grip of surface 120 on member 13. When pulley 16 is held stationary and hub 11 is rotated clockwise, over 150 N*m of torque can be transferred from the hub, through the composite spring, to the pulley without the clutch portion 22 slipping or disengaging. This measure of torque is called "gripping torque".

These values of overrun torque limit and gripping torque are suitable for automotive accessory belt drive applications. For example, when the crankshaft is driving the accessory belt system (ABDS), 100 N*m or more must be transmitted by the crankshaft to the pulley in the clockwise direction. When the crankshaft decelerates rapidly and the accessory belt drive system's inertia encourages the pulley to overrun ahead of the crankshaft, an overrun torque limit value around 10-20 N*m is appropriate to ensure that overrun events occur during significant crankshaft deceleration events such as engine startup and shutdown and transmission gear changes.

A lower value of overrun torque limit would result in overrun events occurring more frequently and during less significant deceleration events. A higher value of overrun torque limit would result in overrun events occurring less frequently and perhaps not occurring during significant deceleration events. The optimal value overrun torque limit depends on the specific engine and design of the belt-driven accessories. Some applications may see optimal overrun torque limit levels lower than 10 N*m, whereas other applications may see optimal overrun torque limit levels in excess of 20 N*m.

An isolating decoupler comprising a hub 11 for connection to a shaft, a pulley 16 journalled to the hub, the pulley having a belt engaging surface, a composite spring 12 having a clutch portion 22, a transition portion 23 and a variable diameter portion 24, the composite spring engaged between the hub and the pulley, the clutch portion diameter reducible in a loading direction for a frictional engagement with the pulley in the loading direction, the frictional engagement of the clutch portion progressively releasable from the pulley in an unloading direction, the variable diameter portion having a diameter which varies according to a torque load, and an inertial member 74 engaged with the hub through a damping member 75.

Although a form of the invention has been described herein, it will be obvious to those skilled in the art that variations may be made in the construction and relation of parts without departing from the spirit and scope of the invention described herein.

We claim:

1. An isolating decoupler comprising:
a hub (11) for connection to a shaft;
a pulley (16) journalled to the hub, the pulley having a belt engaging surface;
a composite spring (12) having a clutch portion (22), a transition portion (23) and a variable diameter portion (24);
the transition portion in the unloaded condition having a helical shape with an increasing diameter from the clutch portion to a composite spring end (25);
the composite spring engaged between the hub and the pulley, the clutch portion diameter reducible in a loading direction for a frictional engagement with the pulley in the loading direction;
the frictional engagement of the clutch portion progressively releasable from the pulley in an unloading direction;
the variable diameter portion having a diameter which varies according to a torque load; and
an inertial member (74) engaged with the hub through a damping member (75).

2. The isolating decoupler as in claim 1, wherein the damping member comprises elastomeric material.

3. The isolating decoupler as in claim 1, wherein the pulley is journalled to the hub on a bushing.

4. The isolating decoupler as in claim 1, wherein the clutch portion is loaded in the winding direction.

5. The isolating decoupler as in claim 1, wherein the composite spring comprises a torsion spring.

6. The isolating decoupler as in claim 1, wherein the pulley comprises a multi-ribbed belt engaging surface.

7. The isolating decoupler as in claim 1 further comprising a composite spring pocket containing a lubricant.

8. An isolating decoupler comprising:
a hub for connection to a driving shaft;
a pulley journalled to the hub, the pulley having a belt engaging surface;
a composite spring having a clutch portion, a transition portion and a variable diameter portion;

the transition portion in the unloaded condition having a helical shape with an increasing diameter from the clutch portion to a composite spring end;

the composite spring engaged between the hub and the pulley, the clutch portion radially reducible in a loading direction for a frictional engagement with the pulley in the loading direction;

the frictional engagement of the clutch portion progressively releasable from the pulley in an unloading direction;

the variable diameter portion having a diameter which varies according to a torque load; and an inertial member engaged with the hub through an elastomeric damping member.

* * * * *